June 4, 1929.  A. H. LINDE  1,715,848
CAGE FOR BALL BEARINGS
Filed March 8, 1927  2 Sheets-Sheet 1

WITNESS:

INVENTOR
Andrew H. Linde
BY
Busser and Harding
ATTORNEYS.

June 4, 1929.                A. H. LINDE                1,715,848
                          CAGE FOR BALL BEARINGS
                    Filed March 8, 1927           2 Sheets-Sheet  2

WITNESS:
Robt R Kitchel

INVENTOR
Andrew H. Linde
BY
Busser and Harding
ATTORNEYS.

Patented June 4, 1929.

UNITED STATES PATENT OFFICE.

ANDREW H. LINDE, OF PHILADELPHIA, PENNSYLVANIA.

CAGE FOR BALL BEARINGS.

Application filed March 8, 1927. Serial No. 173,624.

The object of this invention is to provide a specially designed cage or ball separator for use between the balls after these are assembled in the race grooves between a pair of rings and equally spaced. The cage is particularly useful in connection with the two row deep groove radial type of bearing, but is also advantageously applicable to a single row deep groove radial type of bearing and to other bearings.

Preferred embodiments of the invention are shown in the drawings, in which—

Figure 7:
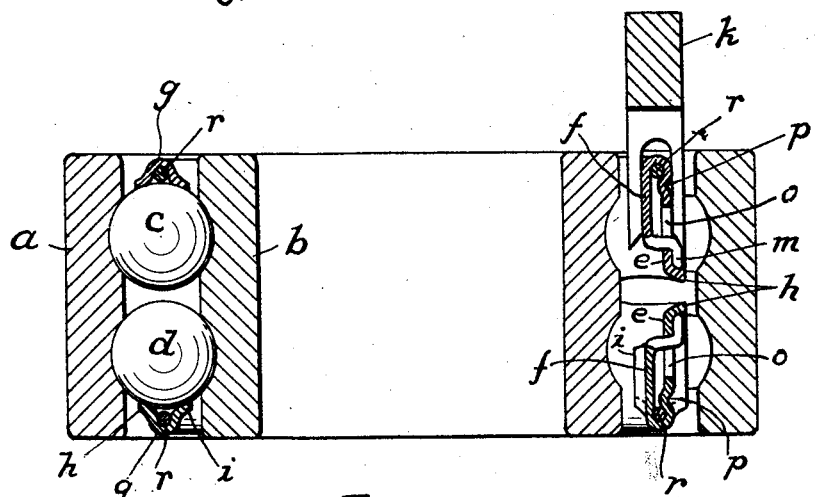
Fig. 7 is a cross-sectional view through a two row bearing to which the cage of Figs. 1 and 2 is applied.

The bearing rings $a$ and $b$, as shown in Fig. 7, are of the deep groove unnotched type which are intended to be assembled with two sets of balls $c$ and $d$ by the eccentric method. In this method of assembly, as is well known, the balls are placed in position in the race grooves prior to the application of the cage or adjusting device. When the cage of the present invention is assembled in a two row bearing of this type, the cage for each row is presented from the outside with the connected edges $g$ of the plates $e$ and $f$ directed outwardly.

Figure 3:
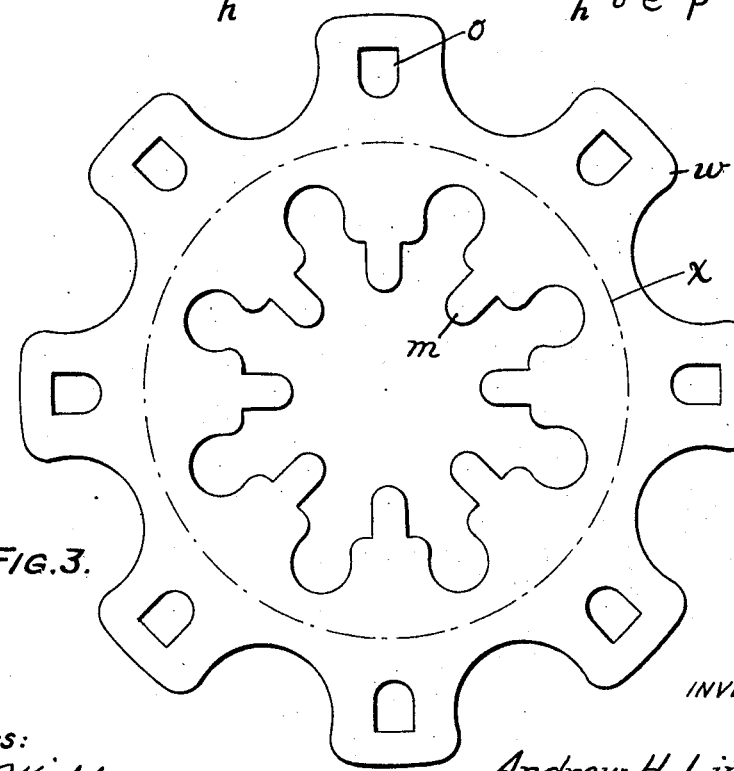
Fig. 3 is a plan view of the blank from which the cage is formed.

The cage for each row of balls is formed from a single piece of sheet metal $w$ of the contour shown in Fig. 3, which is folded on the line $x$ to form two substantially cylindrical concentric rings or plates $e$ and $f$ united by a fold $g$. This fold $g$ is really the bottom or connecting member made by the drawing dies, which also affords a channel for a ring $r$ of wire to be inserted.

A series of recesses for ball pockets are formed in the free edges of the plates. The metal, during the operation of forming ball pockets, is extruded into flanges directed away from the respective plates; that is, the flange $h$ from the outer plate $e$ is directed outwardly and the flange $i$ from the inner plate $f$ is directed inwardly. The flanges are preferably continuous on the outer plate only, the inner plate being preferably left unflanged between the ball pockets.

The pockets in the cage are so proportioned that when the cage is inserted in the bearing, the wings between the ball pockets on the outer plate move outward in a radial direction and, after passing through the narrow space between two adjacent balls, their outer ends, being somewhat wider than the space between the two adjacent balls, wrap around the balls and the cage is locked in position.

Figure 1:
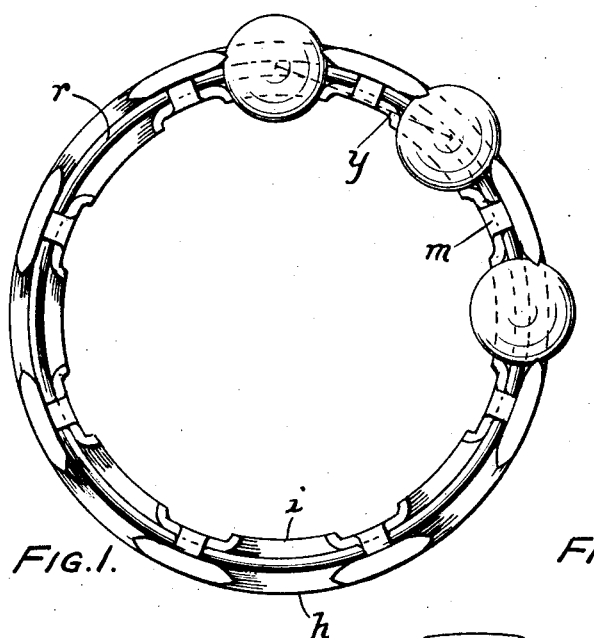
Fig. 1 is a face view of cage with three of the balls in place.

The wings on the inner plate $f$ are so positioned that a line drawn through the center of two adjacent balls (see line $y$ of Fig. 1) passes through the center of the web of a wing on the inner plate. This is an important feature, as this wing, when so positioned, effectively acts as a spacer, the function of the outer wing being to retain the cage in the bearing.

Figure 2:
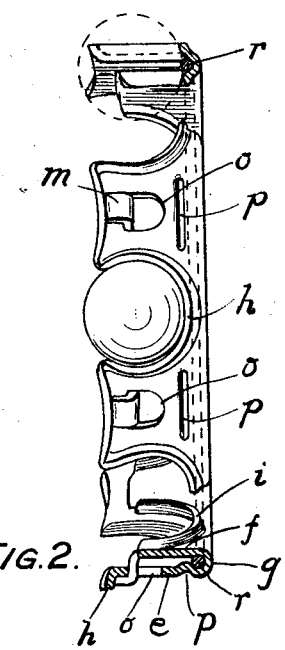
Fig. 2 is a side view of same, partly broken away.
Figure 5:
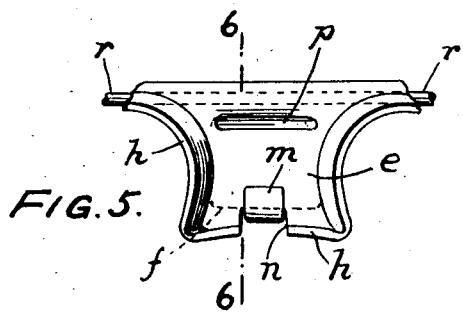
Fig. 5 is a detail view of a short arcuate length of the cage of Figs. 1 and 2, looking toward the center.
Figure 6:
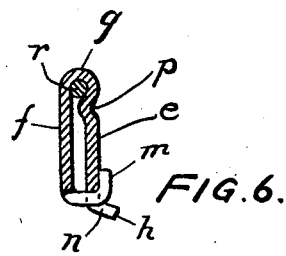
Fig. 6 is a cross-section through the same cage on the line 6—6 of Fig. 5.

Openings through the wings on the outer plate $e$ impart flexibility to the structure between the mouths of the ball pockets and also permit the prongs $m$ from the wings of the inner plate $f$ to be extended through the outer plate and bent thereover, as shown, in order to lock the outer and inner plates together, which in turn prevents the balls, when under load, from spreading the two plates apart, and also more effectively maintains the wrap around balls and prevents the cage from getting out of shape when assembled over the balls. The openings through the wings with which prongs $m$ engage may be either holes $o$ spaced from the free edge of the wings, as shown in Figs. 2, 3 and 7, or recesses $n$ formed in the free edge of the wings, as shown in Figs. 5 and 6.

The depth of each pocket is somewhat greater than half the diameter of the ball intended to be seated therein, and the width of the mouth of opening to the pocket is less than the diameter of such ball; or, stated differently, the walls of the recess or pocket at any selected plane comprises a segment of more than 180 degrees and the chord across the mouth at such a selected plane is less than the diameter of the circle of the intended ball on such a plane.

After the balls $c$ and $d$ have been assembled between the rings $a$ and $b$ and properly spaced apart, the cage is brought into such a position that, by applying outside pressure on the closed side of the cage, the corners of the outer wings engage and pass between and over the balls. Such pressure, so applied, expands the wings in a radial direction, and after the widest parts of the wings have passed the shortest distance between balls, the cage automatically contracts and snaps into position in the bearing.

It may be desired to have the balls fit more securely in their pockets. This may be effected by means of an adjusting tool $k$, which is a ring provided with fingers adapted to engage the prongs $n$ and tighten the inner and outer rings together, thereby causing each pocket at its outer or open end to more effectively embrace its contained ball.

The reinforcing ring or wire $r$ is a feature of much importance since it serves to strengthen the cage at its weakest point. This ring or wire also furnishes a factor of safety, in that if the outer shell should break, the wire would possess sufficient strength to prevent the structure from falling apart.

The wings of the outer plate are indented along an arcuate line to form inwardly projecting beads $p$ (see Fig. 5) which insure the retention of the ring $h$ in the bottom of the channel formed by the connecting fold between the two plates.

Figure 4:
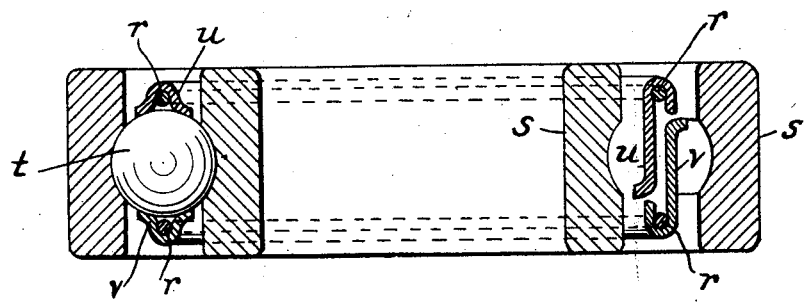
Fig. 4 is a cross-sectional view through a single row bearing to which an embodiment of my invention is applied.

While the invention is particularly useful as applied to a two row bearing, there being one cage for each row of balls, as shown in Fig. 7, the invention may also be advantageously applied to a single row bearing. When the latter application is made, it is desirable to utilize two cages, the cages being entered from opposite sides, as shown in Fig. 4. In this construction, $s, s$ represents the bearing rings, $t$ the balls, and $u, v$ the cages. These cages may be constructed in accordance with the patent issued to me November 30, 1926, No. 1,608,892, except that they also embody one important feature of the present invention, namely, the reinforcing ring $r$.

Having now fully described my invention, what I claim and desire to protect by Letters Patent is:

1. A cage for ball bearings comprising two oppositely disposed annular concentric plates integrally united along one edge of the cage to form a channel of an approximate U-shape in cross-section, and having ball pockets therein and a ring of reinforcing wire extending circumferentially between the plates along the bottom of the channel, clearance space being provided between the ring and the ball pockets to prevent contact of the wire ring and the balls.

2. A cage for ball bearings comprising two oppositely disposed annular concentric plates integrally united along one edge of the cage to form a channel of an approximate U-shape in cross-section, and a ring of reinforcing wire extending circumferentially between the plates along the bottom of the channel, the metal between the ball pockets of one of the plates being indented inward at intervals to provide arcuate beads adapted to confine the reinforcing wire in the bottom of the channel, preventing the wire ring from contacting with the balls.

3. A cage for ball bearings comprising two oppositely disposed annular concentric plates integrally united along one edge of the cage to form a channel of an approximate U-shape in cross-section, each plate being shaped to form spaced apart wings, the wings of one plate being arranged opposite the wings of the other plate to form spaced apart pairs of metal, the wings being shaped to form ball pockets between pairs of wings, the wings of the outer plate being provided with openings, and prongs on the wings of the inner plate extending through the openings in the corresponding wings of the outer plate, thereby locking the plates together and preventing them from spreading and distortion during and after assemblage of the cage with the balls in the bearing.

4. A cage for ball bearings comprising two oppositely disposed annular concentric plates integrally united along one edge of the cage to form a channel of an approximate U-shape in cross-section, each plate being shaped to form spaced apart wings, the wings of one plate being arranged opposite the wings of the other plate to form spaced apart pairs of wings, the metal being shaped to form ball pockets between pairs of wings, and means connecting the members of a pair of wings to prevent their spreading and distortion.

In testimony of which invention, I have hereunto set my hand at Philadelphia, Pennsylvania, on this 4th day of March, 1927.

ANDREW H. LINDE.